US009999214B2

United States Patent
Bartolomucci

(10) Patent No.: US 9,999,214 B2
(45) Date of Patent: Jun. 19, 2018

(54) HEAD HARNESS FOR TREE-STAND USERS

(71) Applicant: Steven T. Bartolomucci, Port Sanilac, MI (US)

(72) Inventor: Steven T. Bartolomucci, Port Sanilac, MI (US)

(*) Notice: Subject to any disclaimer, the term of this patent is extended or adjusted under 35 U.S.C. 154(b) by 0 days. days.

(21) Appl. No.: 14/477,518

(22) Filed: Sep. 4, 2014

(65) Prior Publication Data

US 2015/0173346 A1    Jun. 25, 2015

Related U.S. Application Data

(60) Provisional application No. 61/919,753, filed on Dec. 21, 2013.

(51) Int. Cl.
| | |
|---|---|
| *A01M 31/00* | (2006.01) |
| *A01M 31/02* | (2006.01) |
| *A62B 35/00* | (2006.01) |
| *A47C 7/38* | (2006.01) |
| *B60N 2/48* | (2006.01) |

(52) U.S. Cl.
CPC ............ *A01M 31/02* (2013.01); *A47C 7/383* (2013.01); *A62B 35/0025* (2013.01); *B60N 2/4879* (2013.01)

(58) Field of Classification Search
CPC . A62B 35/00; A62B 35/0006; A62B 35/0012; A62B 35/0018; A62B 35/0025; A62B 35/0031; A62B 35/0037; A47C 7/383; A01M 31/02; B60N 2/4879
See application file for complete search history.

(56) References Cited

U.S. PATENT DOCUMENTS

| | | | | |
|---|---|---|---|---|
| 4,339,151 | A | * | 7/1982 | Riggs ........................... 297/464 |
| 4,427,092 | A | * | 1/1984 | Tentler ......................... 182/134 |
| 5,086,757 | A | * | 2/1992 | Lestini ........................... 602/17 |
| 5,211,696 | A | * | 5/1993 | Lacy ............................ 297/397 |
| 5,234,077 | A | | 8/1993 | Sheriff |
| 5,306,232 | A | * | 4/1994 | Whitmyer ...................... 602/32 |
| D364,684 | S | * | 11/1995 | Bonn et al. .................. D24/191 |
| 5,511,854 | A | * | 4/1996 | Cordia ......................... 297/393 |

(Continued)

FOREIGN PATENT DOCUMENTS

GB              902429  A  *  8/1962   ......... A62B 35/0006

OTHER PUBLICATIONS

Bowsite, Falling From a Treestand—Actual Video Tests, website magazine article (retrieved from Internet https://web.archive.org/web/20060419161224/http://www.bowsite.com/ . . . ), Apr. 2006, 5 pages, www.bowsite.com, US.

*Primary Examiner* — Colleen M Chavchavadze
(74) *Attorney, Agent, or Firm* — Cargill & Associates, Pllc; Lynn E. Cargill

(57) ABSTRACT

A head harness for use by hunters who are already secured by a torso-type safety harness when sitting in a tree stand. The head harness comprises a headband or headband-incorporating cap worn by the hunter, a connector at the rear of the headband, and a receiver secured to the tree at a height corresponding to the hunter's head when sitting in the tree stand. The receiver and connector are configured to mate, with a connection that resists the nodding motion of the hunter's head if the hunter begins falling asleep, thereby helping to prevent falls from the tree stand that would be initiated in the direction of the nodding head.

7 Claims, 13 Drawing Sheets

(56) References Cited

U.S. PATENT DOCUMENTS

| | | | |
|---|---|---|---|
| 6,209,959 B1* | 4/2001 | Meye | 297/393 |
| 6,824,300 B2* | 11/2004 | Drews et al. | 362/515 |
| 7,007,956 B1* | 3/2006 | Pinon | 280/1.5 |
| 7,628,456 B1* | 12/2009 | Swartz | 297/464 |
| 7,832,802 B2* | 11/2010 | Ehlers et al. | 297/393 |
| 8,708,592 B1* | 4/2014 | Gardner | 403/53 |
| 2003/0178255 A1 | 9/2003 | Auer | |
| 2005/0268377 A1* | 12/2005 | Massey | 2/209.13 |
| 2006/0108850 A1* | 5/2006 | Miller | 297/393 |
| 2010/0071993 A2* | 3/2010 | Wydner et al. | 182/3 |
| 2010/0102604 A1* | 4/2010 | Barnes et al. | 297/250.1 |
| 2010/0283310 A1* | 11/2010 | Blackwood | 297/464 |
| 2010/0308630 A1* | 12/2010 | Davis | 297/250.1 |
| 2011/0204696 A1* | 8/2011 | Koehler | 297/464 |
| 2015/0001904 A1* | 1/2015 | Edwards | 297/393 |

\* cited by examiner

HEAD HARNESS FOR TREE-STAND USERS

RELATED APPLICATIONS/PRIORITY BENEFIT CLAIM

This application claims the benefit of U.S. Provisional Application No. 61/919,753, filed Dec. 21, 2013 by the same inventor (Bartolomucci), the entirety of which provisional application is hereby incorporated by reference.

FIELD

The subject matter of the present application is in the field of safety harnesses for hunters (and others) who sit for long periods in tree-stands.

BACKGROUND

Hunters, bird watchers, wildlife watchers, spectators, and others (hereafter collectively "hunters" for simplicity) who use tree-stands for hunting, wildlife observation, and other activities are familiar with the danger of falling asleep during long hours on stand. Safety harnesses for tree-stand hunters are known, generally comprising body harnesses secured to the torso and connected to the tree or to the stand to prevent falling out of the tree.

Safety harnesses will prevent a long drop to the ground if properly worn and installed, but they are not generally designed to prevent a short drop from the stand, often caused by nodding off to sleep. Instead, they are purposely designed to arrest the hunter after a short fall. Even when a safety harness fulfills its purpose by catching a hunter after he topples off the stand, there might remain some risk of injury, such as head or neck trauma from the force of being jerked to a stop or swinging into the tree; asphyxiation if tangled in equipment; heart attack; and "suspension trauma", which apparently can occur if a hunter remains hanging legs down and relatively motionless from the harness for a long period of time.

It would be better if the hunter never fell off the stand in the first place.

BRIEF SUMMARY

I have invented a type of harness intended to be used in conjunction with the usual torso safety harness on a tree-stand, but which can help prevent the initial harness-arrested fall that is often caused by falling asleep. My harness is a head harness that secures the hunter's head to the tree in an upright position, preventing the hunter's head from nodding. If the head nods forward in sleep, or lolls to the side, it is believed that the hunter's body tends to follow, resulting in the unpleasantness of a fall off the stand. With the hunter's head unable to nod, even if the hunter falls asleep sitting upright, it is believed that many potential falls can be averted.

The inventive head harness comprises a headband adapted to be secured frictionally around the hunter's upper head/forehead, and a receiver adapted to be secured to the tree behind the hunter's head at a desired sitting height. The headband and receiver are releasably connected with connector structure secured to the headband and strong enough to keep the headband connected to the tree via the receiver against the relatively low force of a hunter's head nodding due to sleep.

In a currently preferred form, the headband is provided with a rear-facing pin or arm having an enlarged end, such as a ball or cylinder, and the receiver is provided with a female slot adapted to receive the enlarged end when the pin is tilted at a downward angle, i.e. corresponding to the angle of a hunter's head tilted backward (acutely to the rear from vertical) while wearing the headband. The ball-end on the connector allows some side-to-side head motion when secured in the receiver, which can be increased further by using a moderately flexible connector arm. In an alternate form, the receiver includes a slotted hook portion to secure the ball-end of the headband connector.

In a further form, the receiver includes a base fixed to the tree and an adjustable-position bracket movable on the base, the adjustable bracket adapted to receive and secure the connector from the headband. In a still further form, the receiver includes an arcuate tree-engaging face for accommodating an irregular tree surface.

The base may be secured to the tree with a strap or other known means.

The headband is only secured radially on the hunter's head, preventing forward or sideways nodding, but not vertically, so that if the hunter were to slump straight down, or slip feet first off the stand, his head would slide out of the headband with the headband remaining connected to the receiver on the tree. The connection between the headband and the receiver may further be structured to break or separate if subjected to force beyond a certain threshold, i.e. a force greater than the hunter's head nodding off to sleep. The headband may be a stand-alone headband or a headband portion of a hat or cap.

These and other features and advantages of the invention will become apparent from the detailed description below, in light of the accompanying drawings.

DETAILED DESCRIPTION

Figure 1:
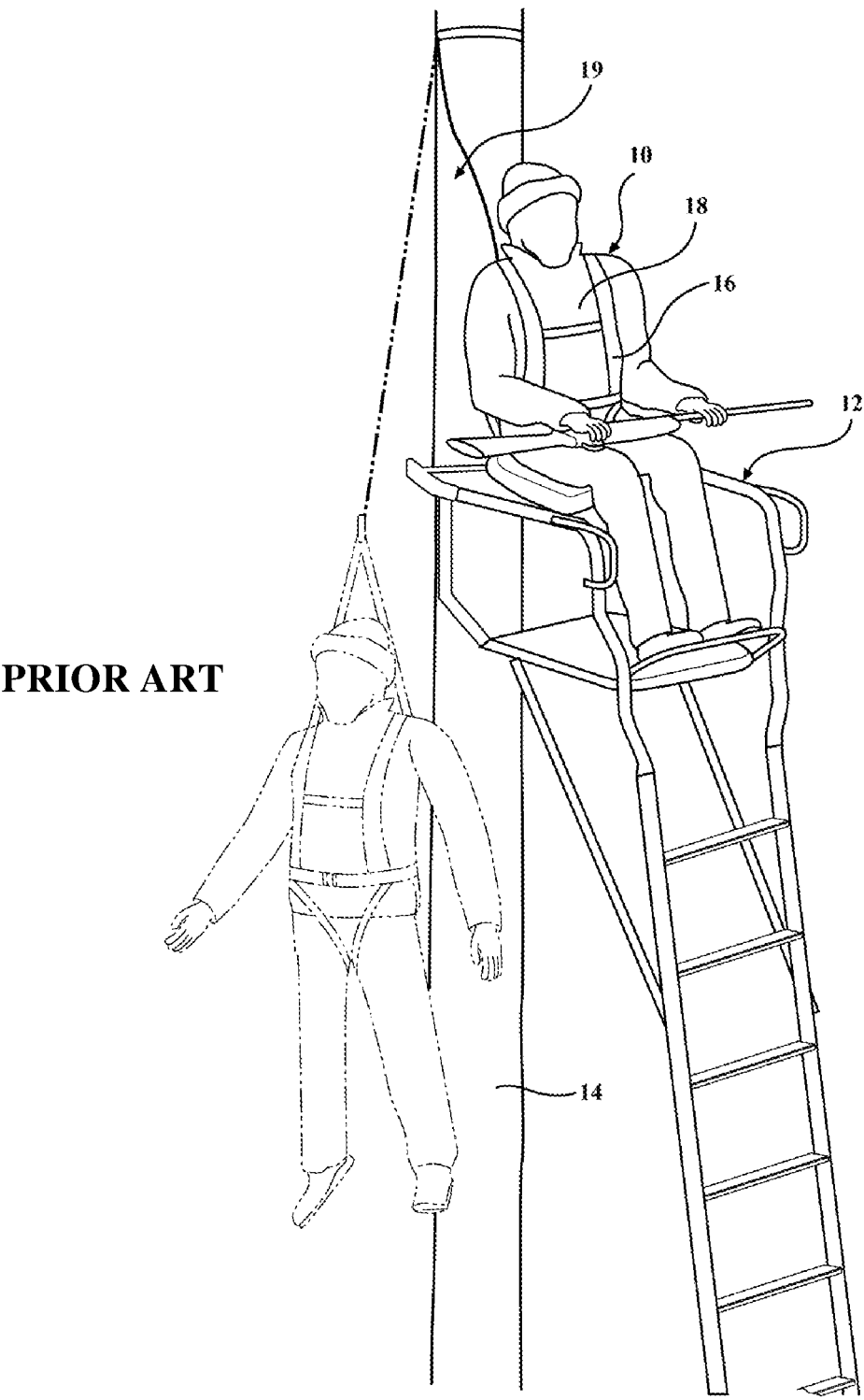
FIG. 1 is a perspective view of a hunter wearing a conventional body harness, sitting in a tree stand in solid lines, and shown in phantom lines after a harness-arrested drop.

Referring first to FIG. 1, a hunter 10 is shown sitting (solid lines) in an example tree stand 12 secured to tree 14 in known manner. Hunter 10 is wearing an example safety harness 16 of a known type, configured to be worn on the hunter's torso 18 and attached to the tree with a strap or tether 19. Safety harness 16 is a schematic representation of many different types of such harness, and is generally designed to arrest the hunter (phantom lines) within a few feet of the tree stand platform if he should fall off.

Since there appear to be risks associated with even a properly arrested fall using a good safety harness, I believe that it is preferable to prevent the hunter from falling off the tree stand in the first place. I have accordingly invented a fall-preventing, rather than fall-arresting, head harness 30, shown in FIG. 2. Head harness 30 secures the head of a sitting hunter in an upright position adjacent the tree 14 (or tree-like object like a telephone or structural pole). It might be more apt to label my device a nod-preventing harness, since I believe that preventing a sleepy hunter's head from nodding forward or to the side is likely to prevent many falls from tree stands.

My harness 30 comprises a headband 32 configured to adjustably and comfortably fit around the head 20 of a hunter 10, a headband connector 34 secured to the back of the headband to face the tree when the headband is worn by the hunter, and a receiver 36 intended to be secured to the tree 14 at the height of a hunter's head 20 when the hunter is sitting in a tree stand 12. Receiver 36 may be secured to the tree in any manner, including but not limited to an adjustable-circumference strap 37 as shown, or other securing means such as nails or magnets or cable. Headband connector 34 may take different forms, and in the currently preferred and illustrated example of FIG. 2 includes a connector pin or arm 34a terminating in a rounded enlarged tip 34b, for example a ball. Headband connector 34 is configured to be connected to receiver 36 on the tree with sufficient strength to resist the forward and sideways motion of a hunter's head nodding off to sleep. The headband 32 is made from a material sufficiently stiff or inelastic, e.g. plastic or not overly-elastic fabric or cloth, to provide resistance to the hunter's head nodding forward when connected to receiver 36 on a tree.

The connection between headband 32 and receiver 36 via connector 34 is not intended to vertically support any amount of weight other than perhaps the weight of the empty headband. In some of the illustrated examples herein, connector 34 is actually designed to fall out of the receiver 36 if the hunter's head is not supporting the headband 32 by wearing it. The connection also allows a hunter to quietly disengage his head from the receiver on the tree in order to make a shot, either by removing the headband or by disengaging the headband from the receiver.

Figure 2:
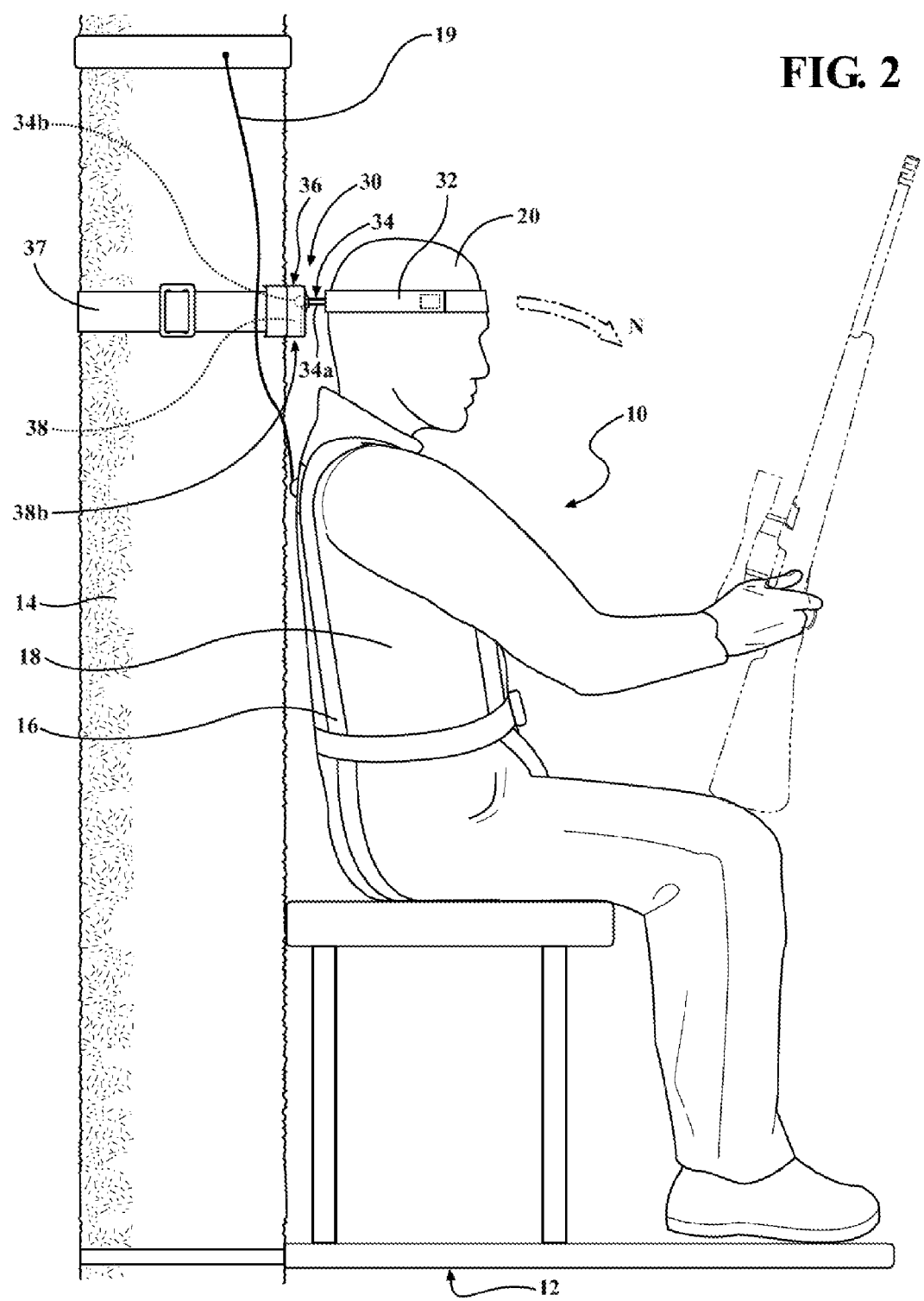
FIG. 2 is a side elevation view of a body-harnessed hunter sitting in a tree stand and using a nod-preventing head harness according to the invention, comprising a headband with connector and a receiver on the tree.

In the example of FIG. 2, the connection between the ball end 34b of connector 34 and the receiver 36 is via a vertical slot or channel 38 in the receiver, the channel having a vertical opening 38b in either the bottom (FIGS. 2 and 3) or the top (FIG. 4) of the receiver. The vertically-opening channel 38 requires the headband connector to be connected in a linear vertical direction, which type of movement typically does not occur with head-nodding due to sleepiness. Accordingly, the hunter is unlikely to accidentally disengage connector 34 (and the attached headband 32) from receiver 36 on the tree.

Likewise, the headband 32 is only secured radially, rather than vertically, around the hunter's head, due to an adjustable fit via elastic or a buckle- or Velcro-adjustable length or tightness. If the hunter 10 were to somehow move his head 20 vertically straight down when headband 32 is secured to the receiver 36 on tree 14, his head would simply slip out of the headband with little or no restraining force. Since head-nodding is typically an arcuate or forward-tilting motion acting radially against the tree-secured headband, rather than a vertical motion, illustrated schematically by arrow N in FIG. 2, the hunter's head 20 is unlikely to slip out of the headband 32 unintentionally.

Figure 3:
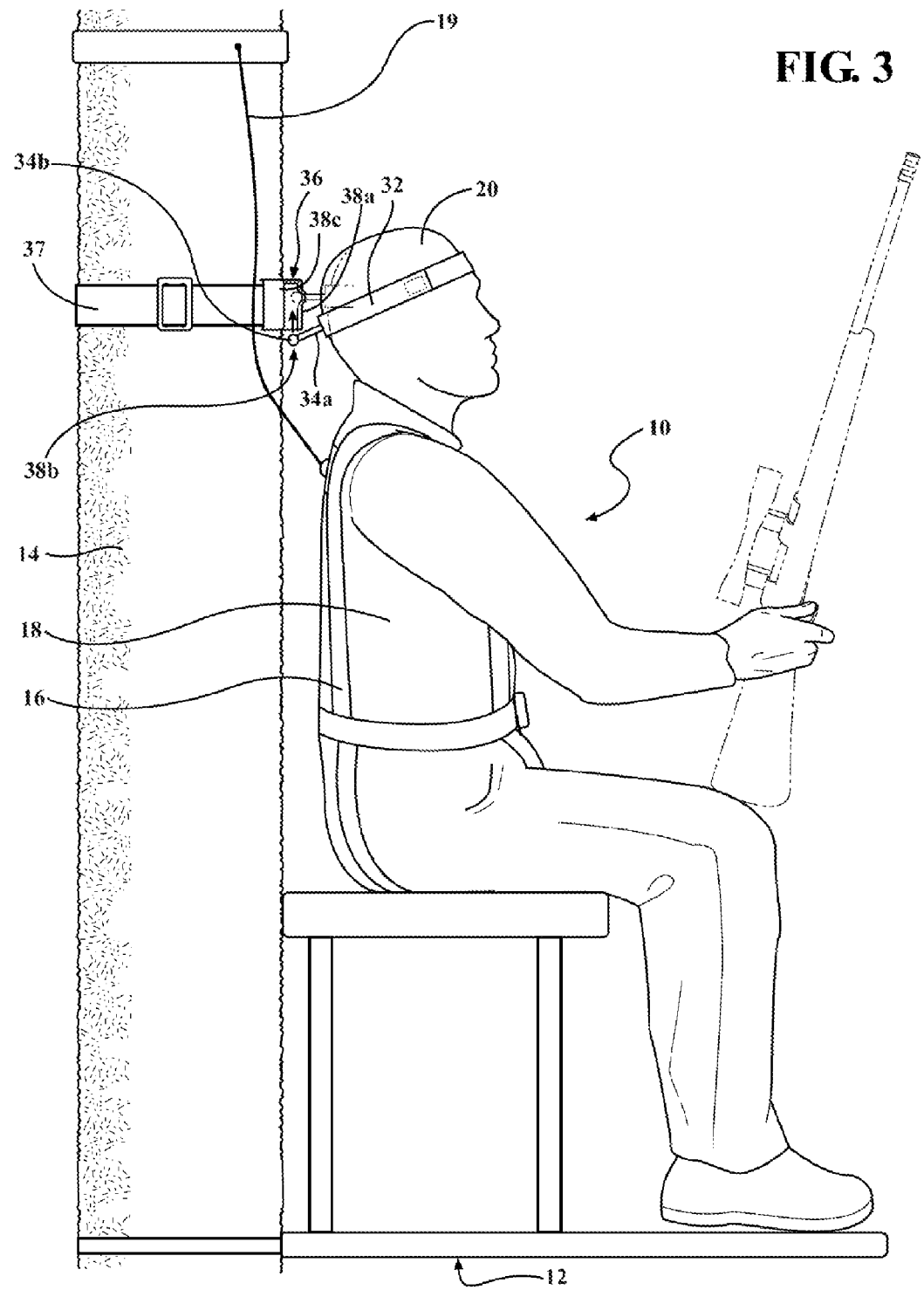
FIG. 3 is similar to FIG. 2, but shows the hunter with his head tilted back to connect the headband connector to a lower end of the receiver.

FIG. 3 shows a method for connecting connector 34 to receiver 36 if the connector 34 uses the ball-and-pin structure. While wearing headband 32, and with receiver 36 installed on tree 14 at a height chosen by the hunter, the hunter tilts his head backward and down until ball end 34b on connector 34 is located below the open lower end 38b of channel 38. This can be accomplished by feel. Once ball end 34b is aligned with channel end 38b, tilting the head back upright causes ball end 34b to ride up into the main channel 38c of channel 38, with connector arm 34a projecting forwardly from the channel through the slot face 38a.

The main channel 38c of channel 38 has a diameter or width sized to allow ball end 34b to slide freely up and down in the receiver. Slot open face 38a has a width narrower than ball end 34b to trap the ball end in the channel in the receiver, while still being wide enough to allow connector arm 34a to slide freely up and down along the face of the receiver.

Figure 2A:
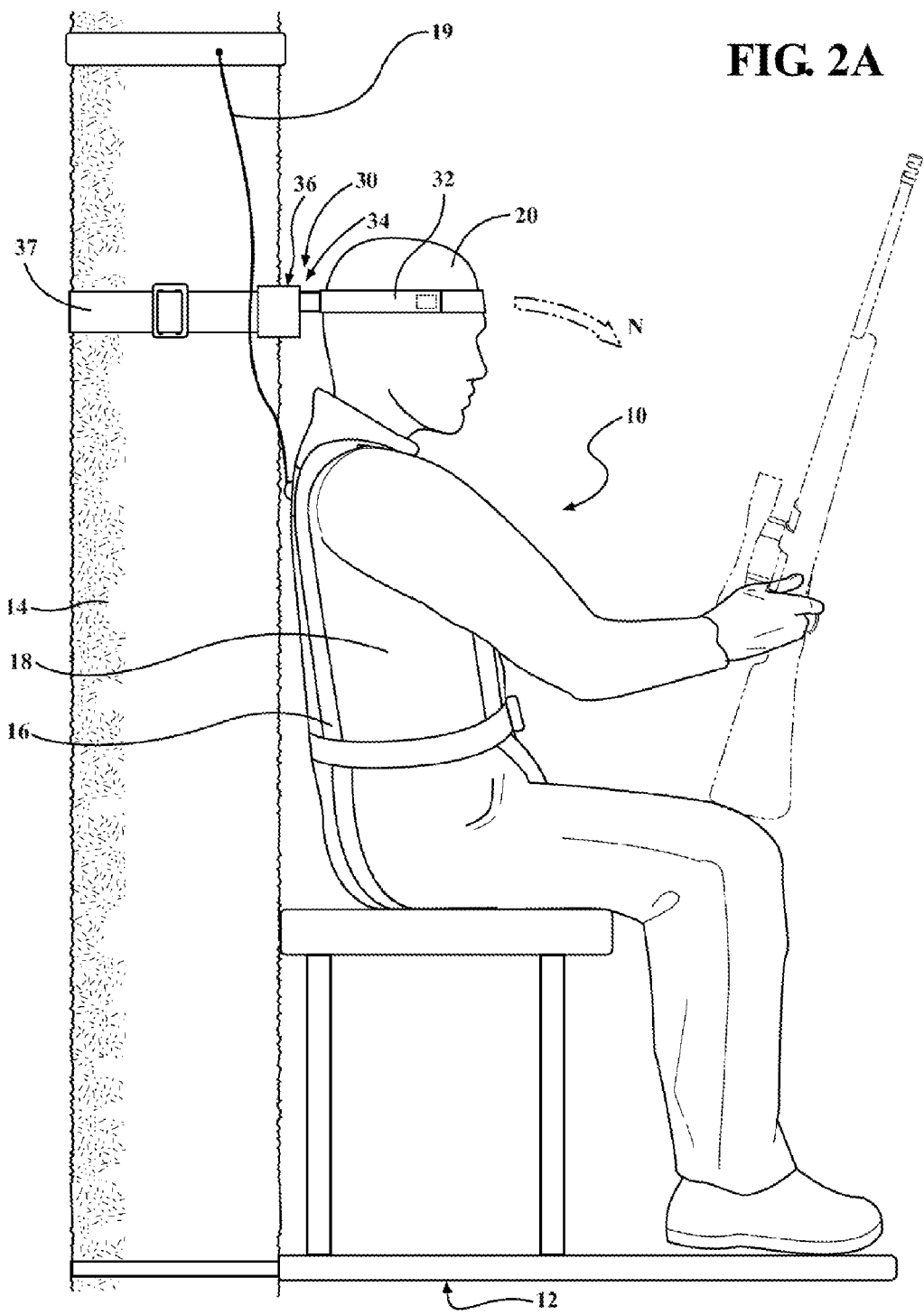
FIG. 2A is similar to FIG. 2, but illustrates the connector and receiver structure more schematically.

It will be understood that mechanical or magnetic connector equivalents to the illustrated ball-and-slot connector and receiver structure 34, 36 could be used, and that such are within the scope of the present invention, provided they establish a connection with the receiver that can made relatively sight-free by the hunter, and have sufficient strength to secure the headband to the tree to prevent nodding. For example, it might be possible to use flexible, tether-like connector structure for 34 between headband 32 and receiver 36, using short elastic connectors, hook-and-loop, cable or cord. A direct connection between the back of the headband 32 and the face of receiver 36 is also possible, as schematically illustrated in FIG. 2A using, for example, the aforementioned hook-and-loop structure or a direct mechanical or magnet connection 34 between headband 32 and receiver 36, without an arm or tether spacing them, although it would tend to limit the hunter's ability to move his head from side-to-side more than the illustrated example. If a connector structure 34 lacks flexibility or side-to-side movement capability, it should be possible to adjust the tightness of headband 32 to allow the hunter to rotate his head in a horizontal plane within the headband to permit some side-to-side vision while the headband is connected to receiver 36 on tree—in this case, a somewhat rigid headband material might be used, with a fairly smooth, low-friction inner surface to allow the head to rotate within the headband when the headband is connected to the receiver.

Figure 4:
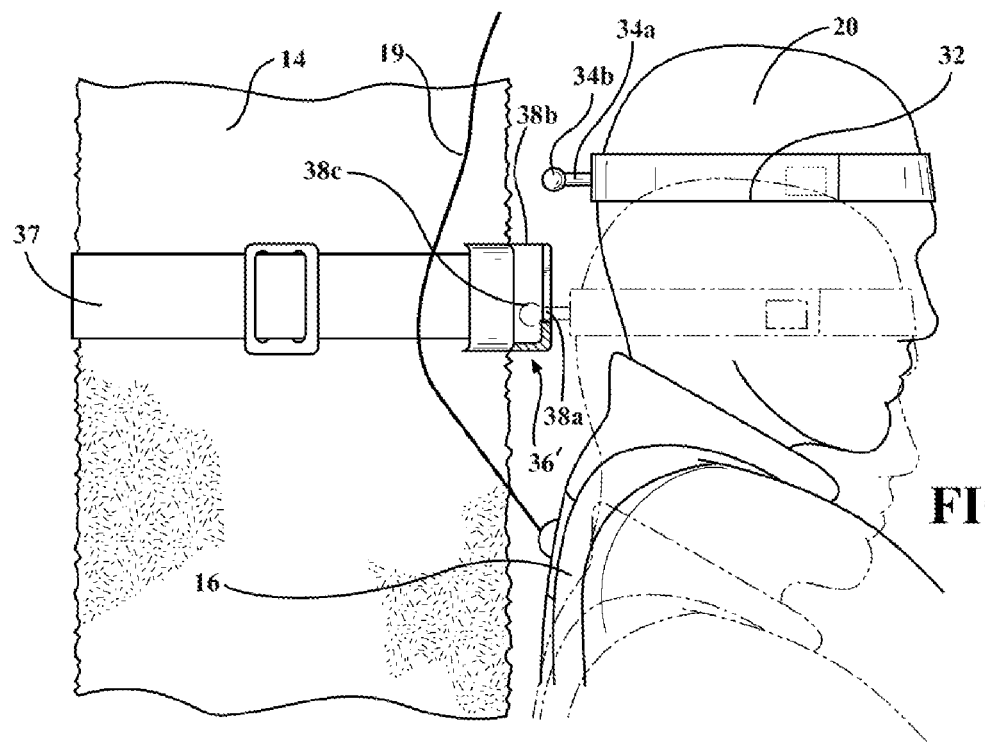
FIG. 4 is similar to FIG. 3, but shows a reverse assembly in which the hunter lowers the headband connector into an upper end of the receiver.

FIG. 4 illustrates a receiver 36' similar to receiver 36 above, except that the channel opening 38b is reversed to receive the ball end 34b of headband connector 34 from the top of the receiver. The motion for connecting connector 34 to the receiver 36 would here require that the hunter stand up a bit and lean back to position ball end 38*b* over channel opening 38*b*, and then sit straight down vertically to engage the receiver. Since a hunter is unlikely to stand up while sleeping, accidental disengagement of the connector 34 from receiver 36 is unlikely.

Figure 5:
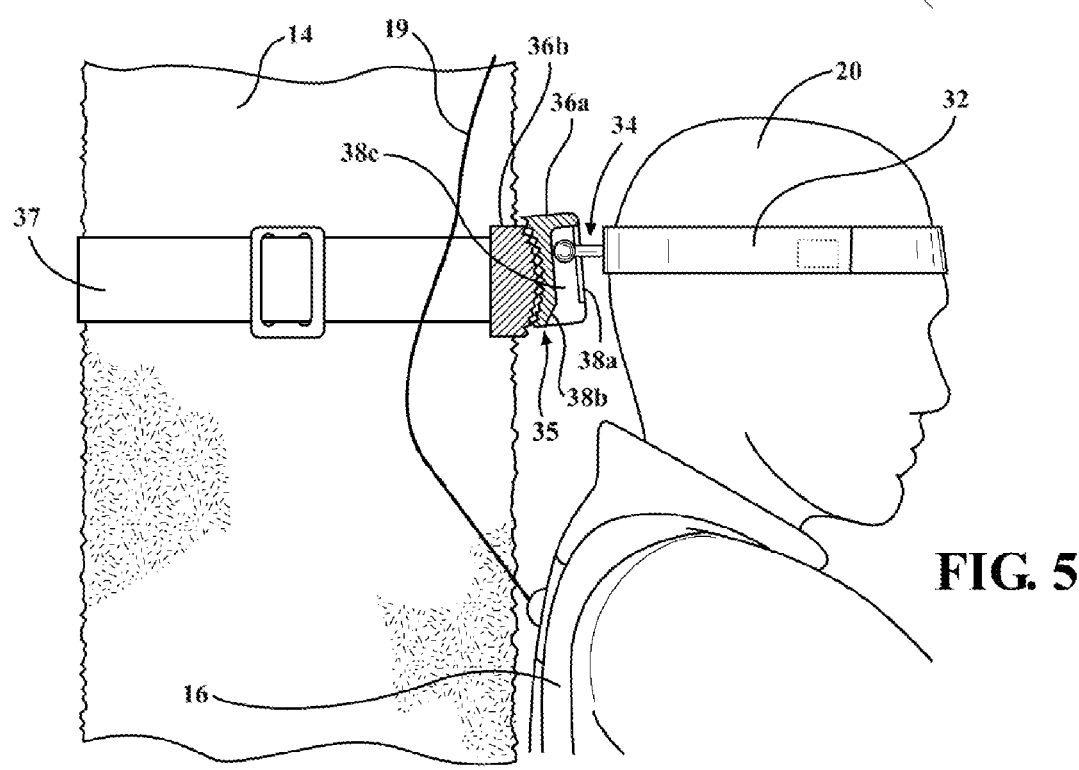
FIG. 5 is similar to FIG. 2, but shows an optional adjustment mechanism on the receiver portion of the head harness.
Figure 6:
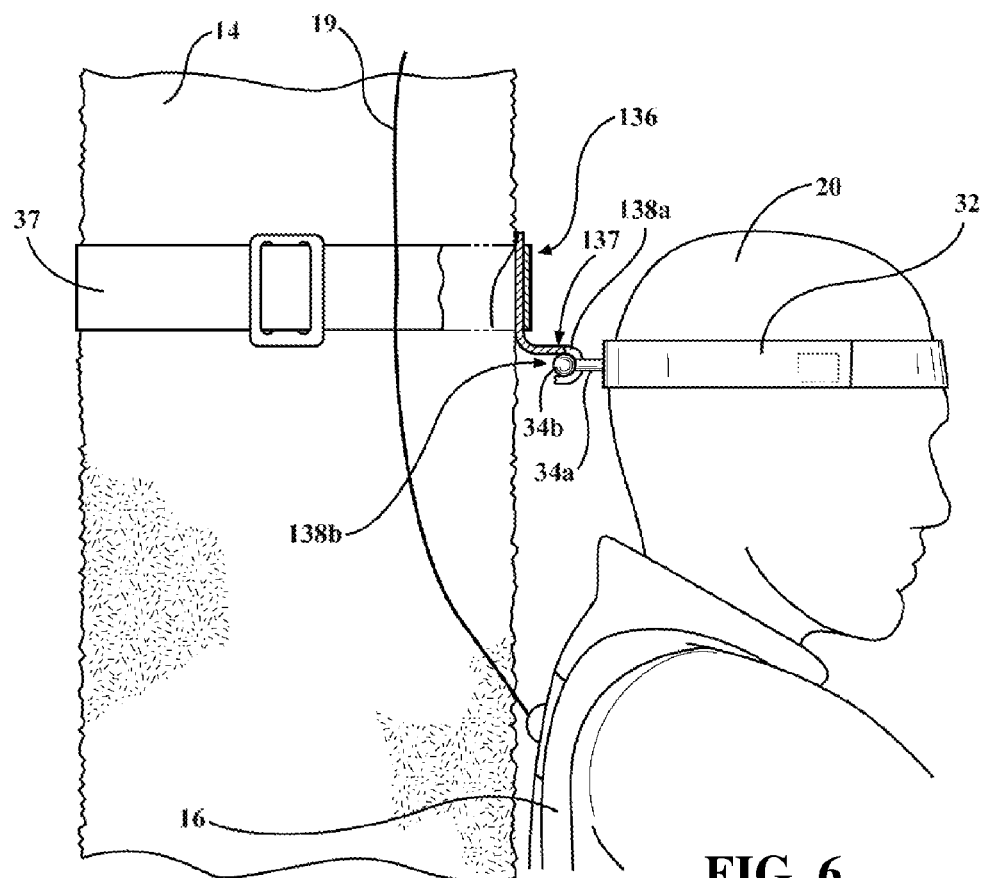
FIG. 6 is similar to FIG. 2, but shows a hook type receiver portion on the tree.
Figure 6A:
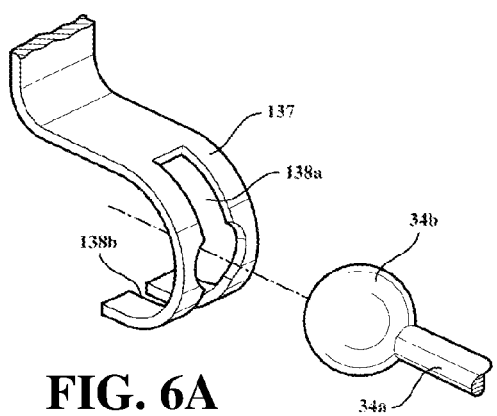

FIG. 5 illustrates an alternate receiver with an angle adjustment feature, comprising a ratchet engagement 35 between a forward portion 36*a* of the receiver and a rear portion 36*b* of the receiver. Receiver halves 36*a* and 36*b* are slidingly coupled along mating arcuate faces with ratchet teeth 35 to establish discrete increments of adjustment. Once adjusted to a comfortable position for the hunter 10, receiver halves 36*a* and 36*b* can be locked in the adjusted position with a latch, detent pin, friction between the mating arcuate faces and/or ratchet teeth, or some other mechanism (not shown). It will be understood that other forms of angle adjustment are possible, and that the illustrated example is not intended to be limiting. For example, magnetic and hook-and-loop connections could be used between the mating faces of the receiver halves.

FIG.'s 6 and 6A show another possible connection between headband connector 34 and receiver 36, in the form of a split hook receiver 136 in which the channel and slot structure is formed by a rear-facing hook 137 with a rear-facing channel opening 138*b* shaped to receive ball end 34*b* of the headband connector in a rotating ball-and-socket type fit.

A front face of the hook 137 is split or slotted open at 138*a* to provide a sliding path or channel for connector arm 34*a*, with less vertical travel and more arcuate range of motion for the connector than the straighter channels shown in previous Figures. The motion for connecting the headband connector 34 to hook 137 is similar to that in FIG. 3 for slotted-channel receiver 36.

Figure 7:
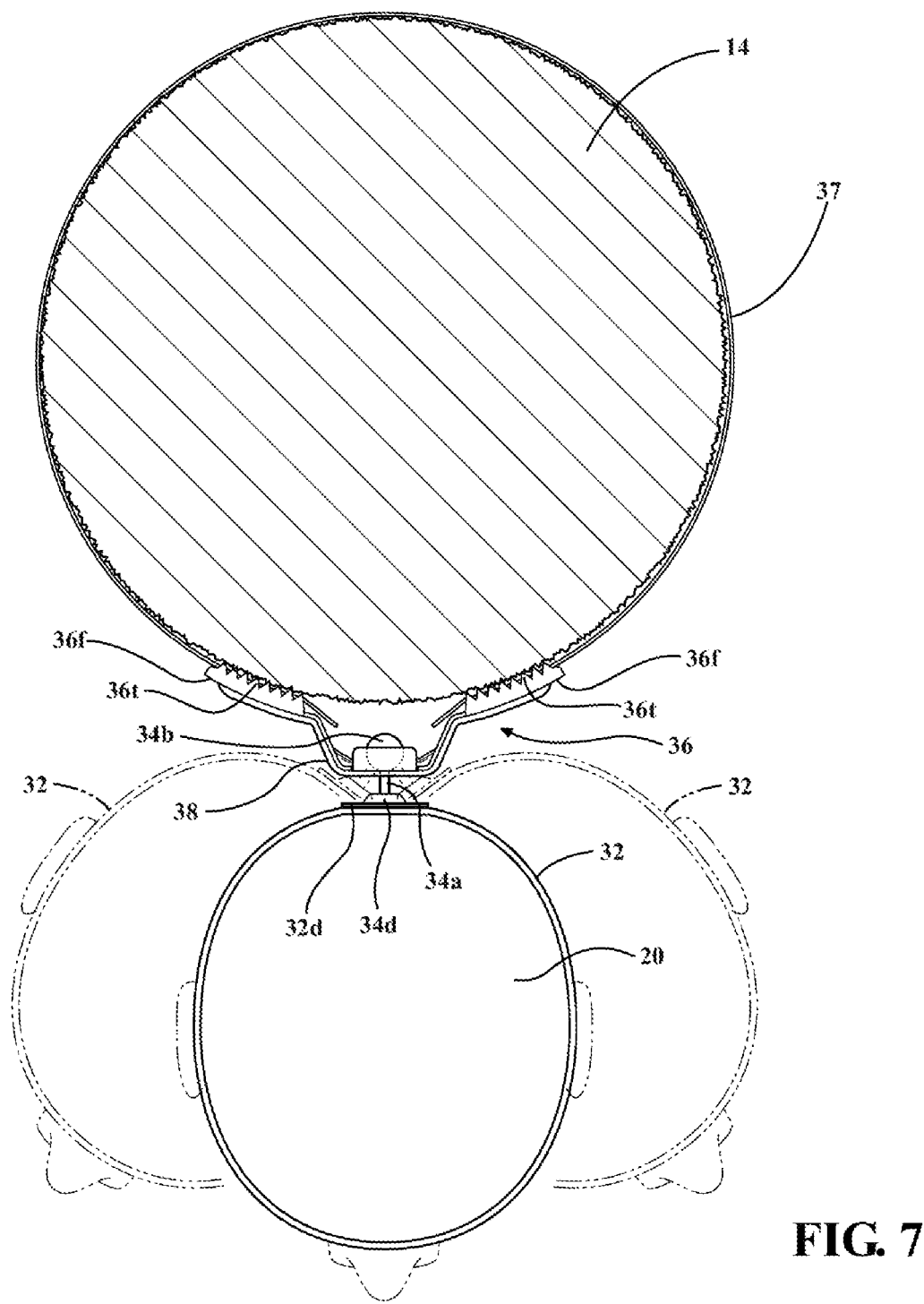
FIG. 7 is a plan view of a hunter using a head harness according to FIG. 2, showing limited side-to-side motion allowed by the connector structure.
Figure 8:
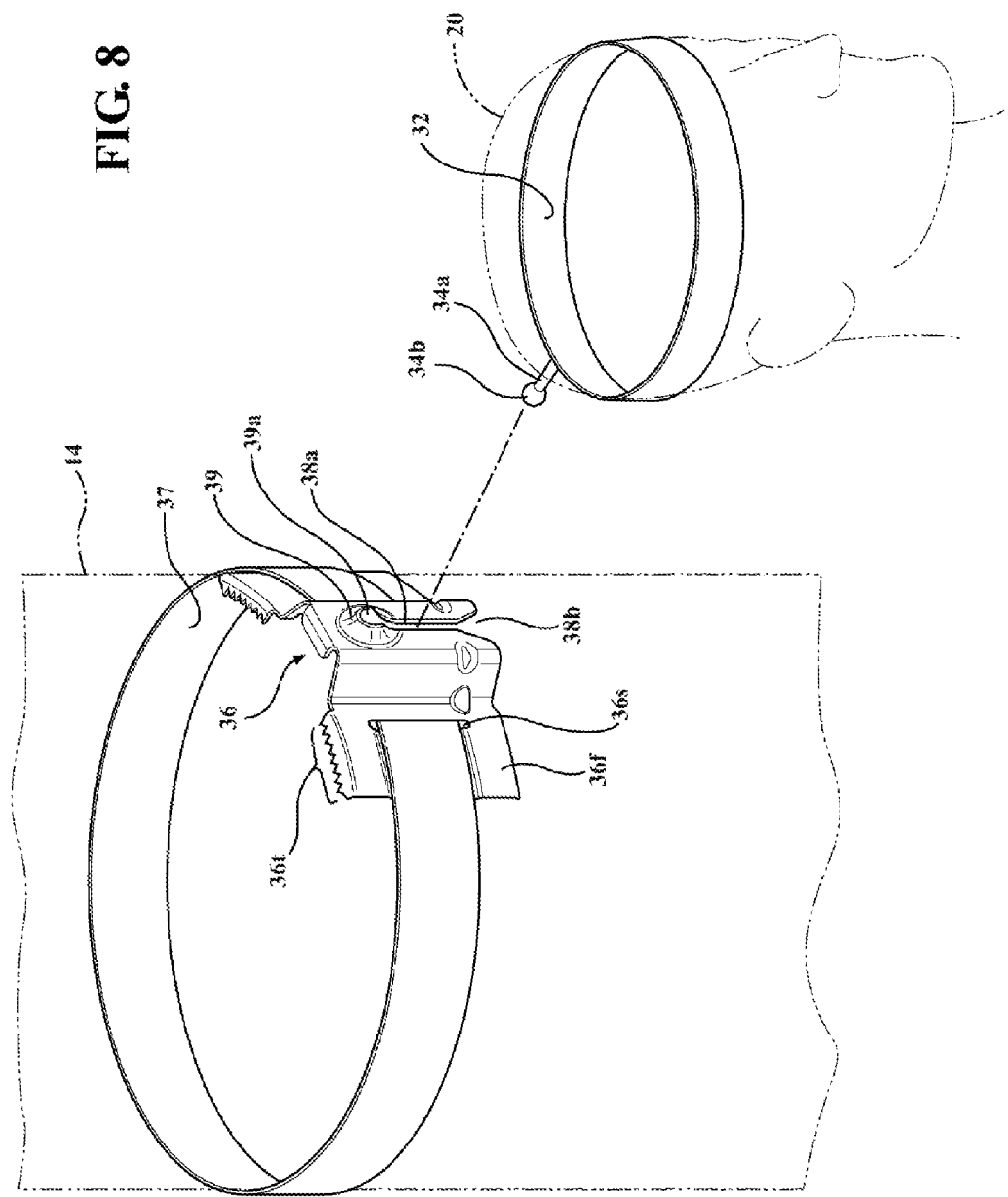
FIG. 8 is a perspective detail view of a currently preferred form of receiver and headband connector secured to a tree, with the headband portion exploded away from the receiver.

FIGS. 7 and 8 illustrate the receiver 36 according to the example in FIGS. 2 and 3 above in more detail. FIG. 7 shows also shows a preferred tree-clamping set of teeth 36*t* formed in flexible, tree-conforming flanges 36*f* extending to each side of the slotted receiver body. The receiver illustrated in FIGS. 7 and 8 lends itself well to being formed by molding, and is made from a polymer, for example a nylon or polypropylene type material.

FIG. 7 also shows some side-to-side head motion permitted by using a flexible material for connector arm 34, and/or by sizing the width of slot 38*a* in the face of the receiver 36 to permit some lateral movement of the connector arm 34*a* therein. Connector 34 is preferably made from a semi-rigid polymer material, secured either permanently or in breakaway fashion to the rear of headband 32, for example by securing an enlarged disc end 34*d* in a fabric pocket 32*d* by sewing, Velcro, adhesive, buttonhole, etc. Alternately, ball end 34*b* of the connector 34 could be formed to break away from arm 32 if subjected to tensile force greater than that typically caused by the nodding of the hunter's head 20. Alternately, the strength of the receiver body or slot, or the strength of the connection between the receiver and the tree-securing means 37, or the strength of the tree-securing means 37 itself could be set to break the receiver 36 free from the tree if subjected to a tensile force greater than typically caused by the nodding of the hunter's head.

FIG. 8 shows at 39 a ball pocket located at the top of channel 38, illustrated as a conical protrusion with a central opening 39*a* in communication with channel 38 for the connector arm 34*a*. The ball pocket 39 is sized for the ball end 34*b* of the connector arm to fall into at the top of the slot, offset from the channel so that the hunter can feel the ball in a "home" locked position at the end of the slot, providing a locating function. The hunter will have to move his head slightly backward to remove ball end 34*b* from the ball pocket 39 and slide down to first disengage the ball end from the pocket and then disengage the connector from the receiver.

Figure 9:
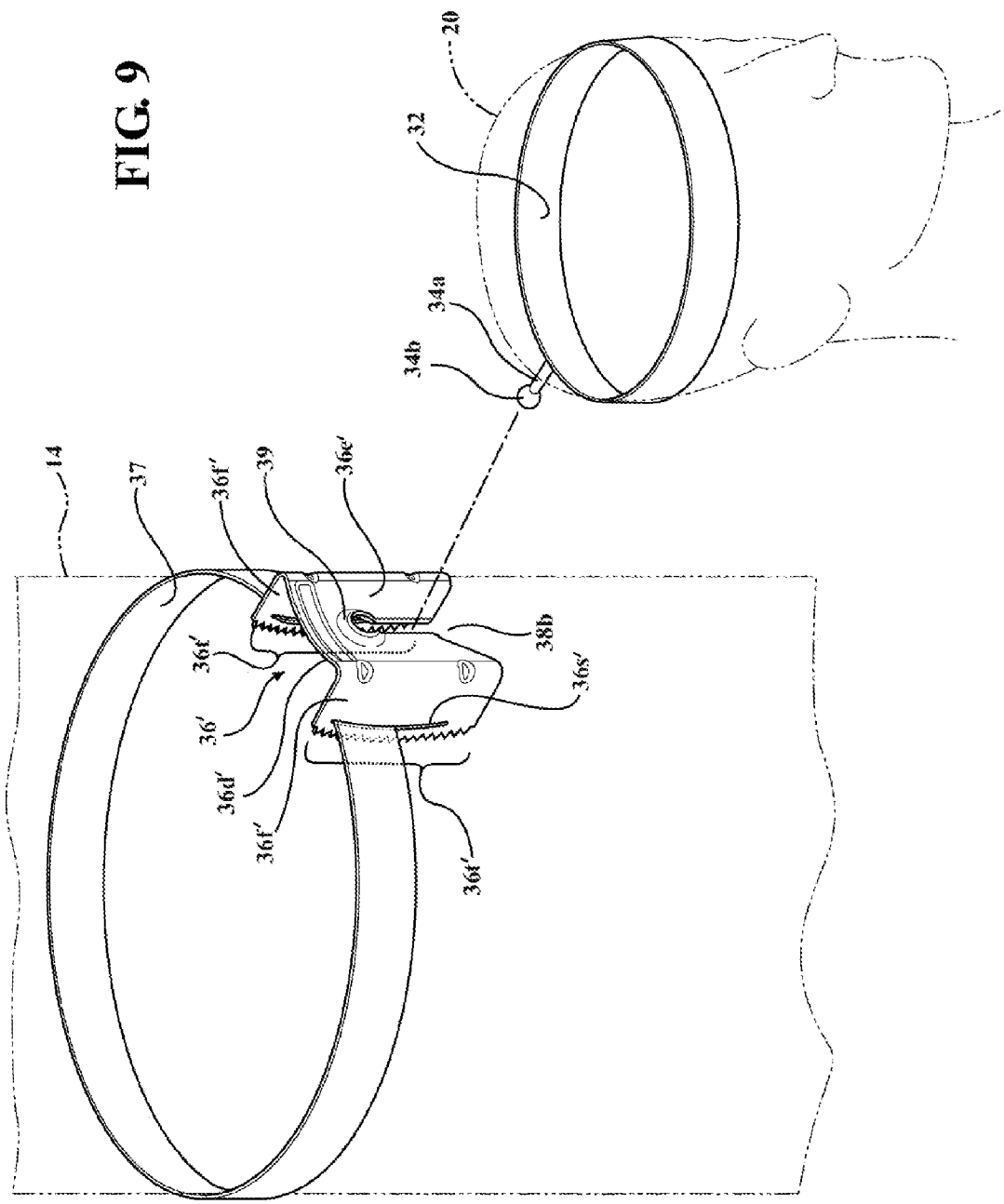
FIG. 9 is similar to FIG. 8, but shows a modified receiver with curved vertical tree-engaging edges and a curved face.
Figure 10:
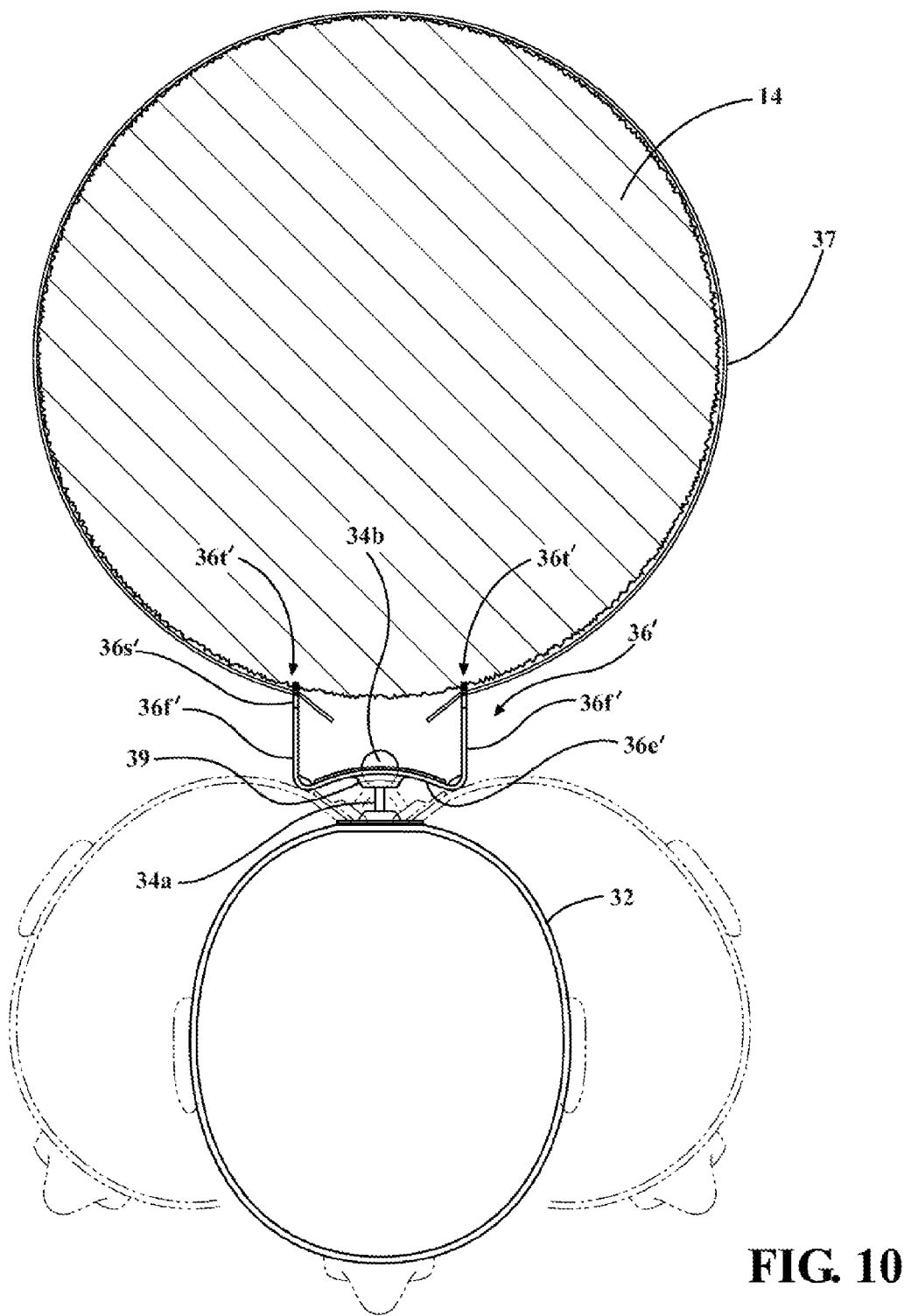
FIG. 10 is a top plan view of FIG. 9, with the headband and receiver joined.
Figure 11:
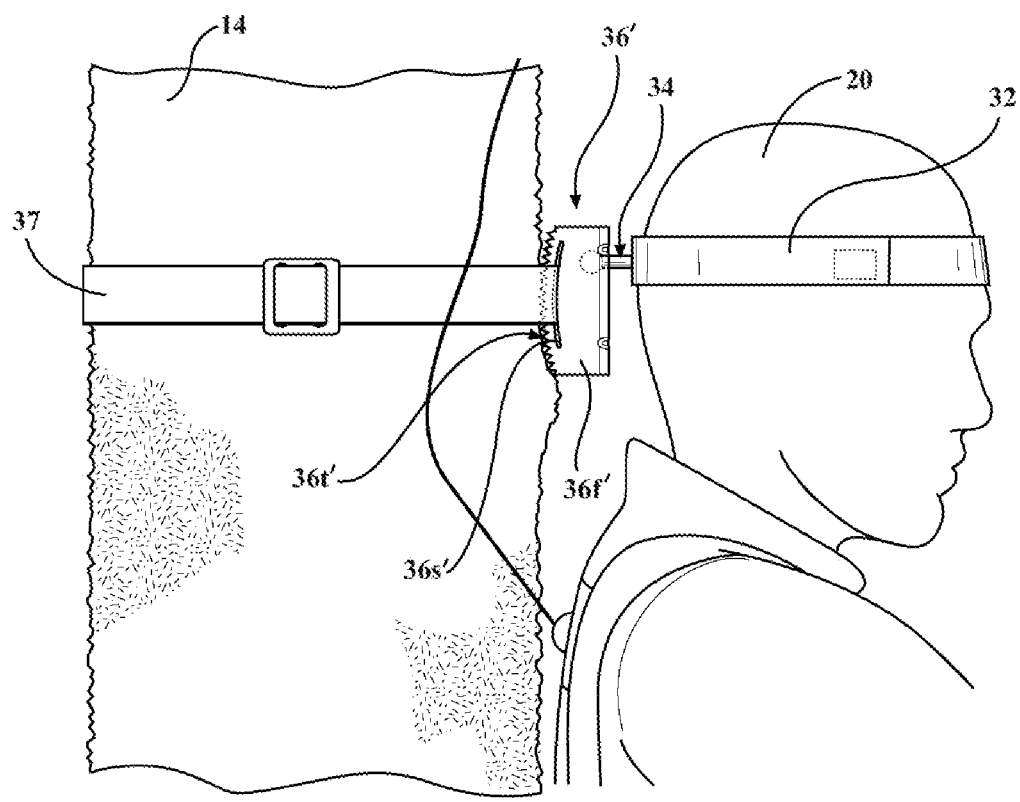
FIG. 11 is a side elevation view similar to FIG. 2, but using the modified receiver of FIG. 10 to accommodate surface irregularities in the tree.

FIGS. 9 through 11 show a modified receiver 36' in which tree-engaging teeth 36*t*' are arranged vertically at the rear edges of spaced vertical flanges 36*f*'. The vertical flanges 36*f*' are joined by intermediate receiver body 36*d*' including a slotted channel and locating pocket structure similar to that in the previous example of FIGS. 7 and 8. Vertical tree-engaging teeth 36*t*' have a convex curvature relative to the tree surface, i.e. in the rearwardly-facing direction. Receiver body 36*d*' has a face 36*e*' with a concave curvature relative to the headband, i.e. relative to the back of the head of a hunter wearing headband 32.

As best shown in FIG. 10, the concave front face 36*e*' of receiver 36 may provide some comfort or a rest for the rear of a hunter's head if the hunter moves his head rearwardly against the receiver 36. The concave front face 36*e*' may also provide a sight-free locating and registering function when the hunter is trying to engage connector 34 on the headband 32 with the receiver 36. The concave front face 36*e*' may also allow easier side-to-side motion of the hunter's head when connected to the receiver.

As best shown in FIG. 11, the curved vertical flanges 36*f*' and their convexly curved tree-engaging edges with teeth 36*t*' are configured to make small mounting angle adjustments to accommodate irregularities in the tree's surface, while the connector 34 and headband 32 remain essentially horizontal and the face of the receiver 36 facing the hunter remains essentially vertical. To ensure a secure fit to the tree, strap slots 36*s*' in flanges 36*f*' are similarly curved, and may be longer than the width of the strap, allowing the receiver 36 an arcuate range of motion and different positioning relative to strap 37 (or vice-versa) when fitting and securing receiver 36 to the tree.

Figure 12:
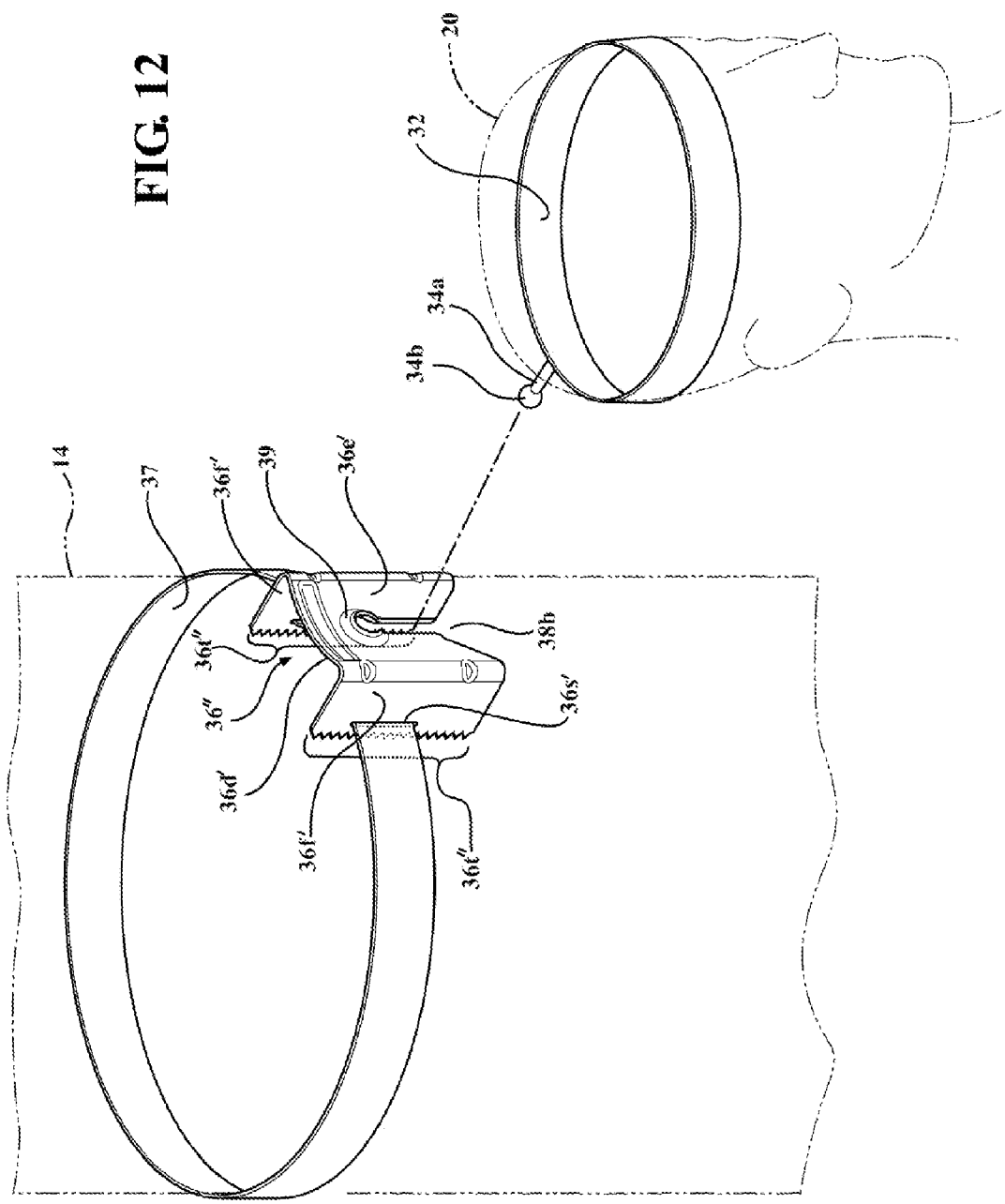
FIG. 12 is similar to FIG. 9, but shows a modified receiver with straight tree-engaging edges.

FIG. 12 shows a further modified receiver 36", identical to receiver 36' except for straight tree-engaging edges 36*t*". These straight edges may provide a more secure fit to a tree's surface if the tree is relatively smooth and free of irregularities.

Figure 13:
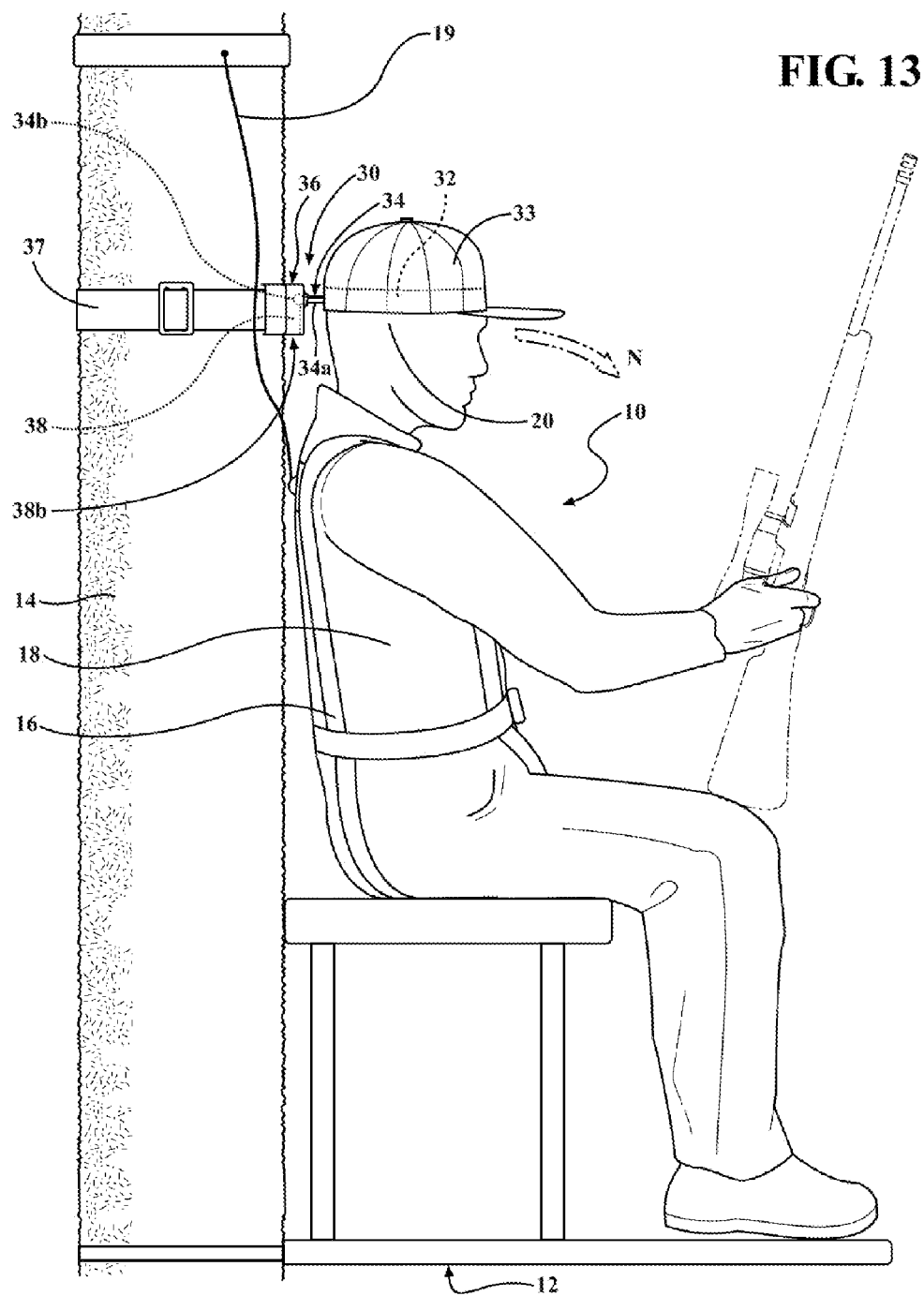
FIG. 13 is a side elevation view similar to FIG. 2, showing the headband portion of the harness system integrated into a cap or hat.

FIG. 13 shows a modified headband arrangement in which headband 32 (and connector 34) are integrated into a cap or hat 33. Cap or hat 33 may be any tip of cap or hat having or benefitting from an integrated headband structure, for example a baseball-type cap. The stand-alone headband 32 of previous Figures may be worn under or over a separate hat or cap, also.

Description of Operation

In operation, the hunter 10 secures receiver 36 to tree 14 at a comfortable height to engage connector 34 when the hunter is seated in the tree stand 12. The hunter then dons the headband 32 with connector 34 facing rearwardly, tilts his head back or otherwise positions his head so that ball end of connector 34 is aligned with the slot opening in receiver 36, engages the ball end of the connector with the slot, and sits with his head substantially upright to hunt. When the hunter is ready to stop hunting, or to stand up to take a shot, he can simply slip the headband off (or undo the headband strap if the strap is secured by a buckle, Velcro™ hook-and-loop tabs, or the like), or tilt his head back again to disengage the connector 34 from the receiver.

If the hunter happens to fall asleep while sitting on the stand with the headband 32 connected to the receive 36, his head will be prevented from nodding forward or to either side in the typical nodding or tilting motion. In this manner the risk of literally "nodding off" the tree stand is believed to be significantly reduced.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

What is claimed is:

1. For a hunter using a tree stand already wearing a safety harness while sitting in a tree stand secured to a tree, a head nod stopping device for preventing the hunter from falling off due to head nodding, comprising:
    a receiver configured to be secured to a tree adjacent a tree stand;
    a securement device for securing the receiver to the tree;
    a headband configured to be worn around the hunter's head, the headband being securable radially but not vertically on the hunter's head, the headband further comprising a connector secured to the rear of the headband and including an enlarged connector end for engaging the receiver in a manner preventing the movement of the headband away from the receiver downwardly in a forward or sideways nodding direction while allowing immediate disengagement by dropping the enlarged connector end down through a downwardly-opening open end of the receiver, thereby freeing the headband from the receiver to allow a better shooting stance for the hunter without being connected to the tree,
    wherein the connector comprises a connector arm terminating in the enlarged connector end, wherein the enlarged connector end of the connector is a ball or cylinder, and wherein the receiver comprises a vertical channel configured to receive the enlarged connector end,
    the vertical channel further comprising a slot with a downwardly-opening open end, said slot having a width sufficient for the connector arm to slide vertically therein, the width of the slot further being less than a width or diameter of the enlarged connector end so as to trap the connector arm with the enlarged connector end horizontally in the channel and wherein the vertical channel is at least partly arcuate, providing a capability of side-to-side motion for allowing the hunter to survey the ground below for animals that he is hunting while still being tethered to the head nod stopping device, although being ready to be immediately disengaged when desired.

2. The apparatus of claim 1, wherein the receiver comprises a locating pocket offset from and communicating with the channel.

3. The apparatus of claim 1, wherein the receiver comprises a rear portion and a forward portion mounted for angular adjustment on the rear portion, the forward portion of the receiver including the vertical channel.

4. The apparatus of claim 1, wherein the receiver comprises a strap-secured bracket comprising a pair of spaced rearwardly-facing vertical elongated tree-engaging edges.

5. The apparatus of claim 4, wherein the tree-engaging edges have a convex curvature in a rearwardly-facing direction.

6. The apparatus of claim 4, wherein the bracket further comprises a front face between the tree-engaging edges, the front face having a concave curvature in a forwardly-facing direction.

7. The apparatus of claim 1, wherein the headband is an integral portion of a cap or hat.

* * * * *